W. L. BLISS.
LIGHTING SYSTEM.
APPLICATION FILED JUNE 22, 1904. RENEWED NOV. 25, 1908.
926,165.  Patented June 29, 1909.
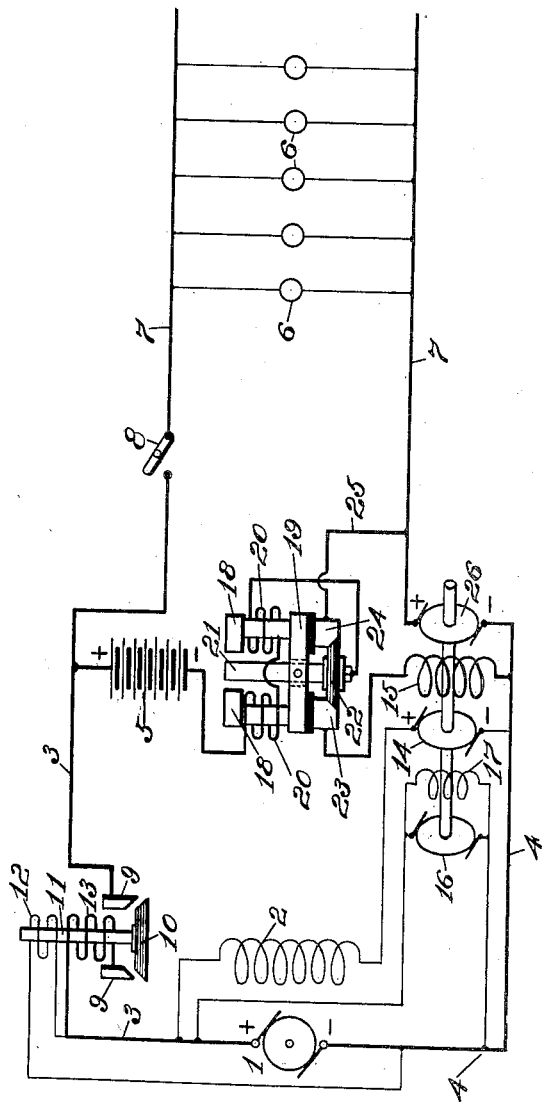
WITNESSES:
Herbert J. Smith
Edwin B. H. Tower, Jr.
INVENTOR.
William L. Bliss
BY Jones & Addington
ATTORNEYS

UNITED STATES PATENT OFFICE.

WILLIAM L. BLISS, OF NEW YORK, N. Y.

LIGHTING SYSTEM.

No. 926,165.   Specification of Letters Patent.   Patented June 29, 1909.

Application filed June 22, 1904, Serial No. 213,680.   Renewed November 25, 1908.   Serial No. 464,499.

*To all whom it may concern:*

Be it known that I, WILLIAM L. BLISS, a citizen of the United States, residing at New York, in the county of Kings and State of New York, have invented new and useful Improvements in Lighting Systems, of which the following is a full, clear, concise, and exact description, reference being had to the accompanying drawing, forming a part of this specification.

This invention relates to improvements in systems of electrical distribution, and although it is particularly adapted for lighting cars and trains, it may be employed for various other purposes.

The system to which the present invention relates employs a generator and a storage battery as the source for supplying current to the lamps and other translating devices. When the generator is in certain stages of operation, it supplies current to the translating devices and also to the storage battery, and when it is inoperative the storage battery furnishes the current for operating the translating devices.

In a system such as has been characterized, wherein the generator is driven in such a way as to be subject to excessive variations in speed, as where the generator is driven by the motion of the train, it is necessary to regulate the generator to confine the voltage developed thereby within certain and safe limits. In practice it is preferable to regulate the generator by means of a suitable automatic regulator which is operated or controlled by the current delivered from the generator and adapted to vary the field strength of the generator.

The regulator tends to regulate the generator to maintain constant that current by which it is either directly or indirectly operated or controlled. Consequently, in such a car or train-lighting system as has the regulator operated or controlled solely by the total current, the generator is regulated to maintain constant total current at constant speed. Inasmuch as the total current is distributed principally between the battery and the translating devices, the current consumed by the translating devices and termed herein the lamp current combined with the current received by the battery and termed herein the battery current is equal to the total current. Assuming that the total current is 50 amperes and that the lamp current is 35 amperes, then the battery current would be 15 amperes. The lamp current necessarily varies from time to time, due to changes in the number of translating devices in operation. Consequently, the lamps often consume so much current that the battery receives little or none of the current delivered by the generator. As a result of this the battery may not receive sufficient current to restore the current which is taken therefrom to supply the translating devices while current is not available from the generator, and consequently the charge in the battery may become very low or completely exhausted during a trip of the car.

The object of the present invention is to provide a car or train-lighting system in which the generator will be regulated to maintain constant battery current at constant speed of the generator, no matter how much current may be consumed by the translating devices.

A further object of the present invention is to provide means for rendering the regulator inoperative while current is being discharged from the battery.

An advantage which arises from regulating the generator to maintain constant battery current at constant speed of the generator under all circumstances, over regulating the generator to maintain constant total current at constant speed of the generator, is that where the car runs upon a certain schedule, it is possible to insure sufficient current being delivered by the generator to the battery to compensate for all the demands which may be made upon the battery, notwithstanding the current which may be consumed by the translating devices.

In accordance with the present invention in its preferred form a counter electro-motive force device serves to vary the field strength of the generator approximately inversely as the speed of the generator varies and thus regulate the generator to confine its output within certain and safe limits.

In the accompanying drawings is illustrated a system which will serve to illustrate the principal features of the present invention, but it will be understood that the invention may be embodied in various other ways.

The system illustrated in the drawings is provided with a generator having an armature 1 and a field 2, said armature being driven in any suitable way by the movement of the car or train, as by being geared to an axle. To the brushes of the armature are connected the supply mains 3 and 4 constituting the supply or generator circuit and delivering current from the generator to the battery 5 and the translating devices 6, said translating devices preferably being connected in parallel in the translating circuit 7—7 which may be controlled by a hand switch 8.

The generator circuit is preferably controlled by an automatic switch which consists of stationary contacts 9, 9, and a movable contact 10 which is carried by a plunger 11, said plunger being primarily operated by a shunt solenoid 12 of fine wire connected across the terminals of the generator. When the automatic switch is closed, a series solenoid 13 of coarse wire connected in series with the switch contacts assists the shunt solenoid in maintaining a better contact in the switch for increasing currents. When the generator in starting develops a certain voltage, the automatic switch is closed by the shunt solenoid, and then current flowing across the switch contacts energizes the series solenoid 13. As long as the generator voltage remains in excess of the battery voltage the two solenoids act conjointly in keeping the switch closed, but when the generator voltage falls below the battery voltage, current flowing backward through the switch contacts from the battery causes the series solenoid to oppose the shunt solenoid, and then the switch is permitted to open to stop the discharge of the battery through the generator.

The generator is preferably regulated by a counter electro-motive force device having an armature 14 and a field or controlling magnet 15, said armature preferably being driven by a shunt wound motor connected across the terminals of the generator and having an armature 16 and a field 17. The counter electro-motive force device has its armature connected in series with the shunt field 2 of the generator and its field or controlling magnet 15 connected in the battery circuit. When the generator is delivering current to the battery the field or controlling magnet 15 is energized, and then the armature 14 which is driven at substantially constant speed by the motor, creates a counter electro-motive force in opposition to the current which tends to flow through the generator field due to the generator voltage.

Upon a variation in the speed of the generator the voltage thereof varies and thus causes a variation in the current flowing through the battery circuit. Consequently, the strength of the field or controlling magnet of the counter electro-motive force device and the counter electro-motive force created in the armature of said device vary, and as said counter electro-motive force opposes the current tending to flow through the field of the generator, due to the generator voltage, the field strength of the generator is varied in almost exact accordance with the variation in the speed of the generator. Since the field strength of the generator is varied in approximately inverse proportion to the variation in the speed of the generator, the output of the generator is confined within certain limits.

The circuit of the field or controlling magnet 15 of the counter electro-motive force device is preferably controlled by a polarized switch having stationary magnets 18, 18 connected by a yoke 19 and provided with windings 20—20. Upon said yoke is pivoted a polarized armature or bar 21 carrying a laminated brush 22 normally adapted to engage insulated contact blocks 23 and 24. With the contact block 23 is connected one terminal of the field or controlling magnet 15, the other terminal of said magnet being connected with the supply main 4. The other contact block 24 is connected by the conductor 25 to one of the conductors 7 of the translating circuit. When the generator is delivering current to the battery, the battery circuit exists from the supply main 3, through the battery 5, windings 20, 20, brush 22, contact block 23, and the field or controlling magnet 15 to the opposite supply main 4, the brush 22 being removed from engagement with the contact block 24. When the battery is discharging current the brush 22 is removed from engagement with the contact block 23 to open the circuit of the field or controlling magnet 15, and then the brush 22 being in engagement with the contact block 24, the battery circuit is completed from one of the conductors 7, through battery 5, windings 20, 20, brush 22, contact block 24, and conductor 25 to the other conductor 7. As the brush 22 is adapted to engage both contact blocks except when sprung out of engagement with one or the other, the continuity of the battery circuit is always preserved, irrespective of the opening and closing of the circuit of the controlling magnet.

As the counter electro-motive force device has its field connected in the battery circuit and accordingly is controlled by the battery current alone, when the demand for current by the translating devices varies the generator output will vary, the same as in any constant potential system of electrical distribution in which the output of the generator is not confined, and consequently the battery current will remain substantially unaffected. To illustrate this let it be assumed that the translating devices are consuming 20 amperes and that the battery is receiving 15 amperes, thus making the total current delivered by the generator 35 amperes, then upon an increase in the lamp current to 35 amperes, the total output of the generator would increase to 50 amperes, so that the battery current would still remain 15 amperes.

When the battery is discharging, the current therefrom is prevented from flowing through the field or controlling magnet of the counter electro-motive force device, as otherwise said current, which is in the opposite direction to the current which the generator forces through the battery when the battery is being charged, would excite the field or controlling magnet of the counter electro-motive force with such polarity that at certain stages in the operation of the generator instead of a counter electro-motive force, a direct electro-motive force would be introduced into the field circuit of the generator, and consequently the generator field current would be abnormally increased.

In the different embodiment of the present invention, the arrangement of the counter electro-motive force device to obtain constant battery current at constant speed of the generator and the manner of rendering said device inoperative or otherwise affecting its operation while current is being discharged from the battery, may be varied and still the features of the present invention will be preserved.

In the operation of the system which has been described, if the car is at rest and it is desired to light the lamps, the switch 8 may be closed to complete the translating circuit, and then the battery will furnish current for lighting the lamps. If the car is in motion the generator will develop a voltage which will be impressed upon the supply mains 3 and 4. Assuming that when the car runs at about 20 miles per hour, the generator runs at 500 revolutions per minute and develops 64 volts, then when the car runs at about 60 miles per hour the generator would run at about 1500 revolutions per minute and would develop about 192 volts if its field were not weakened by the counter electro-motive force device to such an extent that the voltage remains within a safe limit. It will be sufficient to have the generator increase its voltage to about 80 volts at the maximum speed of the car as this would be approximately 2½ volts per cell, which is ample to force the full charging current through the battery, assuming that the battery contains 32 cells having a normal voltage of 64 volts. Accordingly, the generator is preferably regulated by the counter electro-motive force device to allow a variation in the voltage developed by the generator from about 64 volts to 80 volts while the speed of the generator varies from about 500 revolutions per minute at a car speed of 20 miles per hour to about 1500 revolutions per minutes at a car speed of about 60 miles per hour.

Upon starting the car the automatic switch closes when the generator develops, for instance, 64 volts and completes the circuit from the generator through supply main 3, thence dividingly through the battery circuit and the translating circuit, and back to the generator by the supply main 4. While the voltage developed by the generator and that of the storage battery remain substantially equal, the generator and the battery coöperate in supplying current to the translating devices, but when the generator develops more than 64 volts, which is the normal battery voltage, current will be supplied to the storage battery as well as to the translating devices.

The counter electro-motive force device is preferably provided with a second armature 26 which is connected in the translating circuit 7—7 and driven by the same motor and excited by the same field as the armature 14. When current is being delivered to the battery, the armature 26 creates a counter electro-motive force which opposes the current which the generator tends to deliver to the translating circuit, and when the voltage upon the battery circuit varies the counter electro-motive force in the translating circuit is varied in such accordance with the variations in the voltage impressed by the generator upon the battery circuit that the rise in voltage, which is coincident with charging the battery, is prevented from taking place upon the translating circuit, and consequently the translating devices are protected from an excessive voltage, and the voltage to which the same are subjected remains substantially constant. Assuming that 60 or 65 volt lamps are employed, the voltage impressed upon the translating circuit never rises above 65 volts even though the voltage upon the battery circuit rises as high as 80 volts.

Although the system which is illustrated in the drawings is particularly adapted for a single car, a system may be designed for a train of cars which will embody the features of the present invention.

Besides the changes which it has been suggested may be made in the system illustrated in the accompanying drawings, there are many other changes which may be made in said system which will not in any way depart from the present invention or remove from the system the features which this invention is intended to provide.

Having thus described my invention, what I claim as new and desire to secure by Letters Patent is:—

1. In a lighting system, in combination, a generator driven at a variable speed, a storage battery and translating devices arranged in circuit with said generator, means for regulating said generator to confine the output thereof within pre-arranged limits without interfering with ability of said generator to vary its output in accordance with changes in its load, and means for rendering the aforesaid means ineffective whenever said generator and said storage battery conjointly furnish the current for operating said translating devices.

2. In a lighting system, in combination, a generator driven at a variable speed, a main circuit extending from said generator, a storage battery arranged in one parallel branch of said main circuit, translating devices arranged in another parallel branch of said main circuit, an electro magnetic winding for controlling means to regulate the output of said generator, said winding being arranged in the battery branch circuit, and means for rendering said winding ineffective whenever said generator and said storage battery conjointly furnish the current for operating said translating devices.

3. In a lighting system, in combination, a generator driven at a variable speed and having shunt field winding, a main circuit extending from said generator, a storage battery arranged in one parallel branch of said main circuit, translating devices arranged in another parallel branch of said main circuit, said generator being adapted to operate said translating devices and also charge said storage battery and said storage battery being adapted to operate said translating devices when said generator is inoperative, a regulator operatively arranged in circuit to so regulate the strength of said field winding as to confine the output of said generator within pre-arranged limits, an electro magnetic winding for controlling the operation of said regulator, said winding being arranged in the battery branch circuit, and means for rendering said winding inert whenever said generator and said storage battery conjointly furnish the current for operating said translating devices.

4. In a lighting system, in combination, a generator driven at a variable speed, a main circuit extending from said generator, a storage battery arranged in one parallel branch of said main circuit, translating devices arranged in another parallel branch of said main circuit, means adapted to close said main circuit when said generator is operative and to open said main circuit when said generator is inoperative, an electro magnetic winding for controlling means to regulate the output of said generator, said winding being arranged in the battery branch circuit, and means for rendering said winding inert whenever said generator and said storage battery conjointly furnish the current for operating said translating devices.

5. In a lighting system, in combination, a generator driven at a variable speed, a storage battery and translating devices arranged in circuit with the generator, means adapted to regulate said generator to confine the output thereof within pre-arranged limits without interfering with the ability of said generator to vary the output thereof in accordance with changes in the load, and a switch adapted to render said means ineffective whenever said generator and said storage battery conjointly furnish the current for operating the translating devices.

6. In a lighting system, in combination, a generator driven at a variable speed, a main circuit extending from said generator, a storage battery arranged in one parallel branch of said main circuit, translating devices arranged in another parallel branch of said main circuit, a regulator for regulating the said generator to confine the output thereof within pre-arranged limits, an electro magnetic winding for controlling the operation of said regulator, said winding being arranged in the battery branch circuit, and a switch adapted to open the circuit of said winding whenever said storage battery discharges, said switch being operated by an electro magnetic winding arranged in the battery branch circuit.

7. In a lighting system, in combination, a generator driven at a variable speed, translating devices and a storage battery arranged in circuit with said generator, a regulator for regulating the voltage impressed upon said translating devices, and means for rendering said regulator ineffective whenever said generator and said storage battery conjointly furnish the current for operating said translating devices.

8. In a lighting system, in combination, a generator driven at a variable speed, a main circuit extending from said generator, a storage battery arranged in one parallel branch of said main circuit, translating devices arranged in another parallel branch of said main circuit, a regulator for regulating the voltage impressed upon said translating devices, an electro magnetic winding for controlling the operation of said regulator, said winding being arranged in the battery branch circuit, and means for rendering said regulator inoperative whenever said storage battery conjointly furnish the current for operating the said translating devices.

9. In a lighting system, in combination, a generator driven at a variable speed, a main circuit extending from said generator, a storage battery arranged in one parallel branch of said main circuit, translating devices arranged in another parallel branch of said main circuit, a regulator for regulating the voltage impressed upon said translating devices, an electro magnetic winding for controlling the operation of said regulator, said winding being arranged in the battery branch of said main circuit, and a switch adapted to open the circuit of said winding whenever said generator and said storage battery conjointly furnish the current for operating said translating devices, said switch being provided with electro magnetic winding for operating the same.

10. In a lighting system, in combination, a generator driven at a variable speed, a main circuit extending from said generator, a storage battery arranged in one parallel branch of said main circuit, translating devices arranged in another parallel branch of said main circuit, means for regulating said generator to confine the output thereof within pre-arranged limits, a regulator for regulating the voltage impressed upon said translating devices, an electro magnetic winding for controlling the operation of said regulator, said winding being arranged in the battery branch circuit, and means for rendering said regulator inoperative whenever said generator and said storage battery conjointly furnish the current for operating said translating devices.

11. In a lighting system, in combination, a generator driven at a variable speed, a main circuit extending from said generator, a storage battery arranged in one parallel branch of said main circuit, translating devices arranged in another parallel branch of said main circuit, means for regulating said generator to confine the output thereof within pre-arranged limits, a regulator for regulating voltage impressed upon said translating devices, an electro magnetic winding for controlling operation of said regulator, said winding being arranged in the battery branch circuit, and a switch for opening the circuit of said winding whenever said generator and said storage battery conjointly furnish the current for operating said translating devices, said switch being provided with electro magnetic winding for operating the same arranged in the battery branch circuit.

12. In combination, a generator, a storage battery adapted to be charged by said generator, translating devices adapted to be operated by said generator, a counter electro motive force device adapted to regulate said generator to maintain substantially constant battery current at constant speed of the generator regardless of variations in the lamp current, and means adapted to render said device inoperative whenever said generator and said battery conjointly furnish the current to operate said translating devices.

13. In combination, a generator, a storage battery adapted to be charged by said generator, translating devices arranged to be operated by said generator, a counter electro motive force device for regulating said generator to maintain substantially constant battery charging current at constant speed of the generator regardless of variations in the lamp current, and an automatic switch for rendering said device ineffective whenever said generator and said storage battery conjointly furnish the current to operate said translating devices.

14. In combination, a generator, a storage battery adapted to be charged by said generator, translating devices adapted to be operated by said generator, a counter electromotive force device having its field or controlling magnet connected in the battery circuit, and means for rendering the controlling magnet inactive whenever said generator and said storage battery conjointly furnish the current to operate said translating devices.

15. In combination, a generator, a storage battery adapted to be charged by said generator, translating devices adapted to be operated by said generator, a counter electromotive force device having its field or controlling magnet connected in the battery circuit, and an automatic switch for controlling the circuit of said magnet said switch being operated to render said magnet inert whenever said generator and said storage battery conjointly furnish the current to operate said translating devices.

16. In combination, a generator, a storage battery adapted to be charged by said generator, translating devices adapted to be operated by said generator, a counter electromotive force device having an armature connected in series with the field magnet of said generator and a field or controlling magnet connected in the battery circuit, and means for rendering said magnet inactive whenever said generator and said storage battery conjointly furnish the current to operate said translating devices.

17. In combination, a generator, a storage battery adapted to be charged by said generator, translating devices adapted to be operated by said generator, a counter electromotive force device having an armature connected in series with the field magnet of said generator and a field or controlling magnet connected in the battery circuit, and an automatic switch for controlling the circuit of said controlling magnet said switch being operated to render said magnet inert whenever said generator and said storage battery conjointly furnish the current to operate said translating devices.

18. In combination, a generator, a storage battery adapted to be charged by said generator, translating devices adapted to be operated by said generator, a counter electromotive force device adapted to regulate said generator to maintain constant battery current at constant speed of the generator regardless of variations in the lamp current, and a polarized switch adapted to render said counter electro-motive force device inoperative whenever said generator and said storage battery conjointly furnish the current to operate said translating devices.

19. In combination, a generator, a storage battery adapted to be charged by said generator, translating devices adapted to be operated by said generator, a counter electromotive force device adapted to regulate said generator and having a field or controlling magnet connected in the battery circuit, and means adapted to open the battery circuit through said magnet and close said battery circuit through another path whenever said generator and said storage battery conjointly furnish the current to operate said translating devices.

20. In combination, a generator, a main circuit extending therefrom and divided into multiple arc branches, one branch being the battery circuit and the other the translating circuit, a storage battery arranged in the battery circuit, translating devices arranged in the translating circuit, a counter-electromotive force device connected in circuit to regulate said generator to maintain constant battery charging current at constant speed of the generator, regardless of variations in the translating current, and an electrically operated switch connected in the battery circuit to control the operation of said counter-electromotive force device.

21. In combination, a generator, a storage battery adapted to be charged by said generator, translating devices adapted to be operated by said generator or storage battery or both, a counter electro-motive force device adapted to maintain substantially constant voltage upon said translating devices, and means adapted to render said counter electro-motive force device inoperative whenever said generator and said storage battery conjointly furnish the current to operate said translating devices.

22. In combination, a generator, a storage battery adapted to be charged by said generator, translating devices adapted to be operated by said generator or said storage battery or both, a counter electro-motive force device having a field or controlling magnet connected in the battery circuit and adapted to regulate said generator and also maintain substantially constant voltage upon said translating devices, and means adapted to render said counter electro-motive force device inoperative whenever said generator and said storage battery conjointly furnish the current to operate said translating devices.

23. In a system of electrical distribution, a generator, a storage battery, translating devices connected to said generator and said storage battery, means arranged to regulate electrical conditions in said system, an electro responsive device connected in circuit to be subjected to the electrical conditions in said system and arranged to control the operation of said means, and means for rendering said electro responsive device ineffective while said storage battery and said generator conjointly furnish the current to operate said translating devices.

24. In combination, a generator, a storage battery, translating devices, a main circuit extending from said generator and divided into two parallel branches, one the battery branch including the storage battery, and the other the translating branch including the translating devices, an automatic regulator having an electro magnetic winding for controlling the action thereof, said winding being so arranged in circuit that its magnetism is proportional to the current the generator sends through the storage battery, and means for rendering said regulator inoperative when the generator and said storage battery conjointly furnish the current to operate said translating devices.

25. In combination, a generator, a storage battery, translating devices, a main circuit extending from said generator and divided into two parallel branches, one the battery circuit including the said battery, and the other the translating branch including said translating devices, an automatic regulator having an electro magnetic winding for controlling the action thereof, said winding being so arranged in circuit that its magnetism is a function of the current the generator sends through the storage battery, a switch for rendering said winding ineffective whenever said generator and said storage battery conjointly furnish the current to operate said translating devices, and an electro magnetic winding for operating said switch, said winding being arranged in the battery branch.

26. In combination, a generator, a storage battery, translating devices, a main circuit extending from said generator and divided into two parallel branches, one the battery branch including the storage battery, and the other the translating branch including the translating devices, an automatic regulator having an electro magnetic winding for controlling the action thereof, said winding being arranged in the battery branch and means for making said winding independent of the current discharged by the storage battery whenever the storage battery and the generator conjointly furnish current to operate said translating devices.

27. In combination, a generator, a storage battery, translating devices, a main circuit extending from said generator and divided into two parallel branches, one including the storage battery and the other the translating devices, an automatic regulator for regulating the field strength of said generator, an electro magnetic winding for controlling the action of said regulator, said winding being arranged in the battery circuit, a switch controlling the circuit of said winding, electromagnetic windings for operating said switch, said windings being arranged in the battery branch circuit, said switch being operated to render said winding inert whenever said storage battery and said generator conjointly furnish the current to operate said translating devices.

28. In combination, a generator, a storage battery, translating devices, a main circuit extending from said generator and divided into two parallel branches, one including said battery and the other said translating devices, a counter electro motive force device having its armature winding connected in circuit to regulate the field strength of the generator, the field magnet of said counter electro motive force device being so connected in circuit that its magnetism is a function of the current the generator sends through the storage battery, and means for rendering said winding inert whenever said generator and said storage battery conjointly furnish the current to operate said translating devices.

29. In combination, a generator, a storage battery, translating devices, a main circuit extending from said generator and divided into two parallel branches, one including the battery and the other the translating devices, a counter electro motive force device having its armature winding connected in circuit to regulate the voltage impressed upon said translating devices, the field winding of said counter electro motive force device being so arranged in circuit that its magnetism is a function of the current the generator sends through the storage battery, and means for making said winding independent of the current discharged by said storage battery whenever said generator and said storage battery conjointly furnish the current to operate said translating devices.

In witness whereof, I have hereunto subscribed my name in the presence of two witnesses.

WILLIAM L. BLISS.

Witnesses:
J. N. ROBERTSON,
EDWIN B. H. TOWER, Jr.